(12) United States Patent
Rosebrock

(10) Patent No.: US 7,757,302 B2
(45) Date of Patent: Jul. 13, 2010

(54) COMPUTER SECURITY SWITCH

(76) Inventor: Paul Rosebrock, 113 Woodbine Ter., Morganton, NC (US) 28655

( * ) Notice: Subject to any disclaimer, the term of this patent is extended or adjusted under 35 U.S.C. 154(b) by 1055 days.

(21) Appl. No.: 11/387,304

(22) Filed: Mar. 23, 2006

(65) Prior Publication Data

US 2007/0226812 A1 Sep. 27, 2007

(51) Int. Cl.
G06F 1/26 (2006.01)
G06F 17/30 (2006.01)
(52) U.S. Cl. .............................. 726/34; 726/2
(58) Field of Classification Search .............. 726/2–7, 726/16–18, 22, 27–30, 34–36; 725/66; 713/192–194; 623/24
See application file for complete search history.

(56) References Cited

U.S. PATENT DOCUMENTS

| 5,151,782 | A | * | 9/1992 | Ferraro ......................... 725/66 |
| 5,661,786 | A | | 8/1997 | Horn |
| 5,742,686 | A | | 4/1998 | Finley |
| 5,888,212 | A | * | 3/1999 | Petrofsky et al. .............. 623/24 |
| 5,938,767 | A | | 8/1999 | Horn |
| 6,105,136 | A | * | 8/2000 | Cromer et al. ................ 726/34 |
| 6,158,297 | A | | 12/2000 | Polosky et al. |
| 6,292,898 | B1 | * | 9/2001 | Sutherland .................... 726/34 |
| 6,880,110 | B2 | | 4/2005 | Largman et al. |
| 2003/0009683 | A1 | * | 1/2003 | Schwenck et al. ........... 713/194 |
| 2003/0172205 | A1 | * | 9/2003 | Bastian ......................... 710/45 |
| 2005/0123113 | A1 | | 6/2005 | Horn |
| 2005/0188425 | A1 | * | 8/2005 | Horn ........................... 726/34 |

OTHER PUBLICATIONS

Internet Traffic Cop. Police Your Internet Connection. http://www.trafficcop.com/about.htm, printed out on Mar. 11, 2006.
Chumbo.com at http://www.chumbo.com/Info.aspx?id=309037, printed out on Mar. 11, 2006.
BFG Internet TrafficCop Standby Switch at http://www.bestbuy.com/site/olspage.jsp?skuId=7442387&type=product &id=1125238693265, printed out on Mar. 11, 2006.

* cited by examiner

*Primary Examiner*—Hosuk Song
(74) *Attorney, Agent, or Firm*—Summa, Additon & Ashe, P.A.

(57) ABSTRACT

A computer security device for controlling the passage of data signals to and from a computer allows the operator to control access to that computer by outside parties. The device is a switch that can be connected to or disconnected from a computer in modular fashion. The switch may include a rotatable lever connected to a contact body with a plurality of data paths thereon. The communication paths are connected or disconnected to data lines by arcuate movement of the lever. The switching mechanism may be a spring board within a platform. Moving the spring board in and out of the plane of the platform connects and disconnects data lines to the computer. The switch may be a rotary switch that turns to connect and disconnect the data lines. The device may also be a single throw, twelve pole switch that allows data connection or disconnection.

7 Claims, 9 Drawing Sheets

COMPUTER SECURITY SWITCH

BACKGROUND

Computer security is an ever-increasing priority in household as well as commercial computer applications. To date, most attempts to prevent virus attacks, hackers, and other intrusions focus on software protection. Users design firewalls, build layers of access barriers, and install commercially available products to halt any undesirable electronic information from being communicated to and from the user's computer. The problem with software solutions is that just as soon as one protective solution is created, another more sophisticated intrusion is developed around it.

The problem of computer security is exacerbated by new technologies that give us faster and more convenient communications abilities. Of course, these enhancements come with a price—increased vulnerability to attack. This problem is particularly acute in regard to internet access. Linking any computer to the internet increases the chances for an intruder to find its way into that computer's memory. Even with the most up to date software protections, internet connections still lead to compromised security. The only fool-proof way to ensure that a computer cannot be tapped by a hacker or subject to random attack is by disconnecting that computer from its connection to the internet.

Disconnecting a computer, particularly a home computer, from the internet can be advantageous if one chooses to work on highly confidential material from a computer's hard drive. By breaking the physical connection between a computer and a data source, one can ensure that neither a human nor a machine intruder will gain access to the data in use. One problem in modern electronics, however, is that an internet connection may be available even when the user thinks the connection has been discontinued. When a user connects to the internet by a digital subscriber link, for example, that link may be maintained to a computer's hard drive even when the user is not actively communicating via the internet. That is, just by subscribing to the digital carrier and maintaining a cable from the computer to the data outlet, one essentially maintains a permanent link that a hacker could use to breach the security system.

As discussed above, the only fool-proof way to block a computer from any potential attack is by physically disconnecting the data path. Manually disconnecting the path could be accomplished by disconnecting the data line, such as the cable connecting the computer to other telecommunications equipment. The problem with this solution, however, lies in the inconvenience of accessing the proper cables to disconnect them. Accessing data cables and other telecommunications equipment requires moving peripheral machinery, climbing behind the furniture and reaching into crowded spaces to find the right cable. Once disconnected, the awkward exercise must be repeated to re-connect the data cable the next time the user wants telecommunications access.

The invention herein meets a need in the industry by providing a mechanism for physically disconnecting a communications connection to the internet or another data source without requiring the user to change the way a computer is connected to other equipment or the way cables are arranged. The user can physically disconnect a data connection by the simple turn of a lever or push of a button from the comfort of the desk chair. The result is that data transmission is absolutely impossible in either direction to and from the computer. Without an avenue for data transmission, security problems are minimized if not altogether extinguished.

Other efforts at disconnecting a communications line from a computer have severe limitations in the way that they must be used. In particular, U.S. Pat. No. 5,938,767 (Horn, 1999) and U.S. Publication No. 20050188425 (Horn, 2005) show a device for preventing children from accessing the internet from a home computer. These Horn devices require using a physical key to allow and disallow communications signals to and from the computer. The problem with the Horn device is that the key has to be maintained in a secure location but easily retrieved. Losing the key when the device is locked could lead to a significant delay in using the computer. Child-proofing a computer could lead to inadvertently adult-proofing the computer as well. Horn's disclosure, furthermore, is limited to preventing a certain person from using the data communication ability at the computer. Horn's device does not lend itself to securing a computer from unwanted intruders from remote locations. Other documents authored by Horn focus on connecting a locking device to a computer via cables and requiring the data cable to be non-removable by certain people, particularly children. See U.S. Pat. No. 5,661,786 and U.S. Publication No. 20050123113. Again, Horn's devices are not security devices that protect a computer from intrusive data communications or on-line theft of information.

U.S. Pat. No. 6,880,110 (Largman, 2005), is another example of efforts to prevent data communications so that a computer can be maintained in a more secure state. The Largman '110 patent claims a method and an associated computer program for automatic "self-repairing" of a computer from software corruption. The key to the self-repairing aspect of the Largman's patent is that portions of the computer can be "locked down" to a restricted access state by switching certain communications electronics. Largman states that a switch can be used to interrupt the ability of the communications device to transfer data to the data port. The Largman patent, however, discloses a software-controlled method that fails to physically disconnect a data source from the computer at issue. A programmer that could defeat Largman's software security would maintain ample physical access to the computer's memory and could cause significant damage accordingly.

U.S. Pat. No. 5,742,686 (Finley 1998) discloses a device and method for dynamic encryption of information including data, voice, and graphics. Finley uses a relay switch to disable the data flow at the option of the user. While Finley discloses a switch for disconnecting a data stream, Finley's disclosure makes no mention of a switch that a user on a personal computer controls, particularly for internet security purposes. Like the above-noted Largman '110 patent, Finley's switch cannot be conveniently added to a personal computer in an overall computing circuit that gives the user flexibility in accessing or disabling an internet connection.

U.S. Pat. No. 6,158,297 (Polosky 2000) discloses a micro-machined lock that includes counter-meshing gears that turn in response to an electronically input code. Upon entering the correct code, the gears turn to an unlocked position. Once unlocked, the device provides a path for data. If the wrong code is entered, even once, then the gears lock up and the data path is inaccessible until reset in accordance with security standards. The Polosky device is designed to be extraordinarily inaccessible to anyone other than those with access to reset the gears. Locking out users, however, can be an inconvenient method of providing computer security from unwanted intruders.

Another commercial product, known as the BFG Internet Traffic Cop shows a computer add-on for blocking and allowing internet access. The BFG product, however, requires power from the USB port on the computer or from an AC adaptor. This product, therefore, adds to the inconvenience of installation.

These prior publications show a need in the field of telecommunications for a user accessible switch that physically disconnects a data source from a computer to absolutely ensure that no undesirable communications can occur. The switch is preferably a stand-alone unit that requires no outside power source for operation.

BRIEF SUMMARY OF THE INVENTION

The invention is a computer security device for controlling the passage of data communication signals to and from a computer so that a computer operator can completely control the level of access of outside parties to that computer. The invention is particularly useful in physically disconnecting a data source, such as an online service provider, from a home or personal computer so that the computer operator can be completely assured that hackers and other intruders do not have access to the computer memory.

In one embodiment, the computer security device is a switch that can be connected or disconnected from an existing computer in a modular fashion. Otherwise, the switch could be mounted integrally within the computer casing so long as the user has personal and convenient access to the switch. The switch of this invention may have a rotatable lever connected to a contact body with a plurality of data communication paths thereon. The communication paths may be selectively connected or disconnected to data lines between the computer and a data source, wherein arcuate movement of the lever connects or disconnects at least one of the communication paths from at least one of the data lines to control the transmission of at least one communications signal to or from the computer.

The switching mechanism of this invention may be in the form of a spring board within a platform, such as a printed circuit board wherein a portion of the spring board is connected to the printed circuit board, and the remainder of the spring board is detached from the printed circuit board. Moving the spring board in and out of the plane of the platform connects and disconnects data lines to the computer.

Otherwise, the computer switch may be a rotary switch with a handle that turns to connect and disconnect data lines to a computer with a data source.

In yet another embodiment of the invention, the computer security device for controlling the passage of data communication signals to and from a computer may be a single throw, twelve pole switch, in which the switch has at least four input contacts and at least four output contacts providing communications links between a data source and a computer.

Similarly, the computer security switch may include a relay assembly for switching at least one data communications path back and forth between an open position and a closed position, wherein the open position prevents data transmission through the relay assembly and the closed position permits data transmission through the relay assembly

DETAILED DESCRIPTION

Figure 1A:
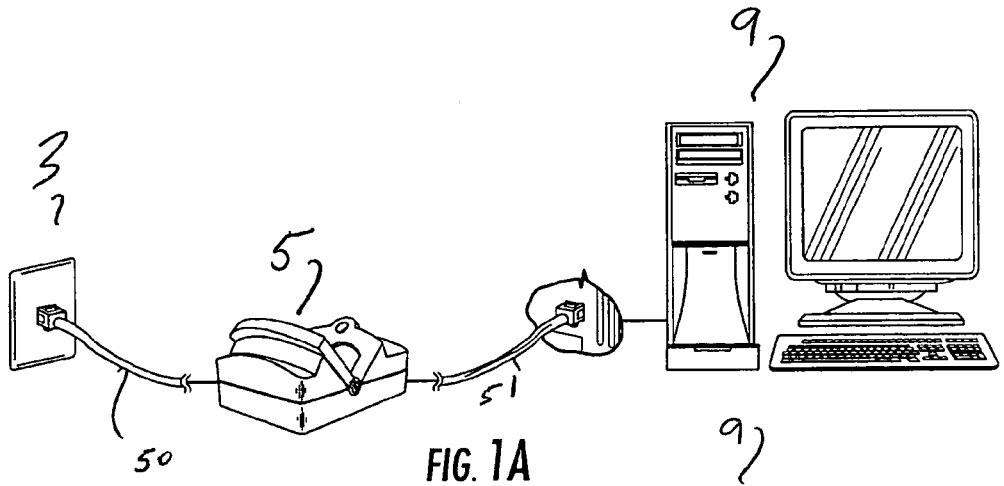
FIG. 1A is an environmental drawing showing the computer security switch connected between a telephone dial up data source and a personal computer.
Figure 1B:
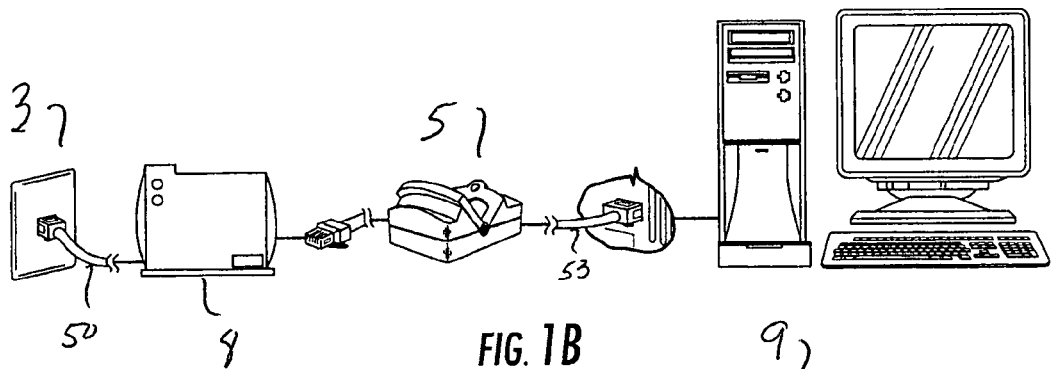
FIG. 1B is an environmental drawing showing the computer security switch connected between a telephone dial up modem and a personal computer.
Figure 1C:
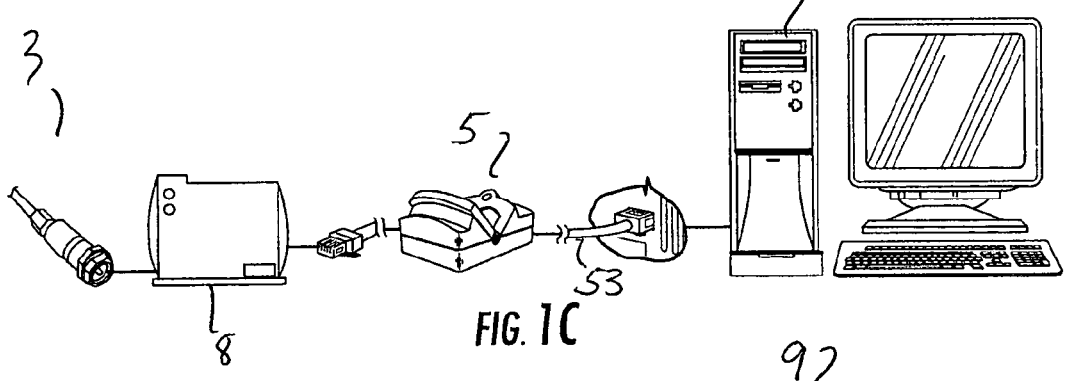
FIG. 1C is an environmental drawing showing the computer security switch connected between a digital service line data source and a personal computer.
Figure 1D:
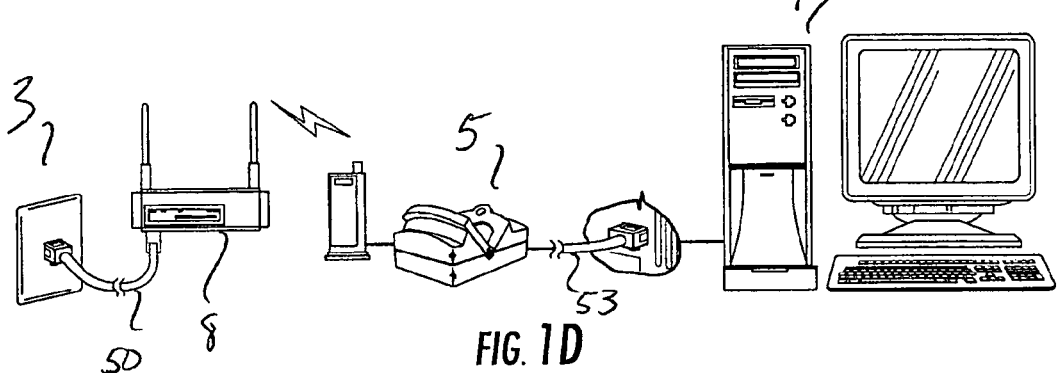
FIG. 1D is an environmental drawing showing the computer security switch connected between a wireless modem data source and a personal computer.

The invention is a security device (5) that controls incoming and outgoing data communications between a computer and a data source. The security device (5) physically breaks the data connection so that it is impossible for intruders to penetrate the user's computer. The security device (5) is efficient in that it requires no extra equipment, such as keys, computer memory, specialized software, or other components that complicate use. The security device (5) may be configured so that it requires no outside power source for operation. The security device (5) is readily available for operation at the option of the computer user and by a simple manual process.

In a first embodiment, the invention is a security device (5) for controlling the passage of data communication signals to and from a computer (9). As shown in FIG. 1, the security device (5) receives data signals from a data source (3). The data source (3) may include, but is not limited to, a telephone line for dial-up service to the data source (3) or a modem (8) connection to a computer (9). Embodiments with a modem (8) connection allow a computer (9) to communicate with data service providers including, but not limited to, digital subscriber lines, both direct and wireless, and cable companies that provide a variety of types of digital content.

The security device (5) of this invention connects between the data source (3) and the computer (9). The security device (5) includes an input port (13) and an output port (14) for allowing data communication between the computer (9) and the data source (3) via a registered jack data line, such as a telephone line. In a preferred embodiment, the security device (5) includes a second pair of ports (15, 16) for connecting the computer (9) and the data source (3) via a universal serial bus (USB) cable, such as the CAT-5 line shown in FIGS. 1C and 1D. The security device (5), therefore, accommodates both types of signal lines that are commonly used in the field today. In this fashion, one can easily install the security device (5) between the data source (3) and the computer without changing the type of line currently in use.

Figure 2:
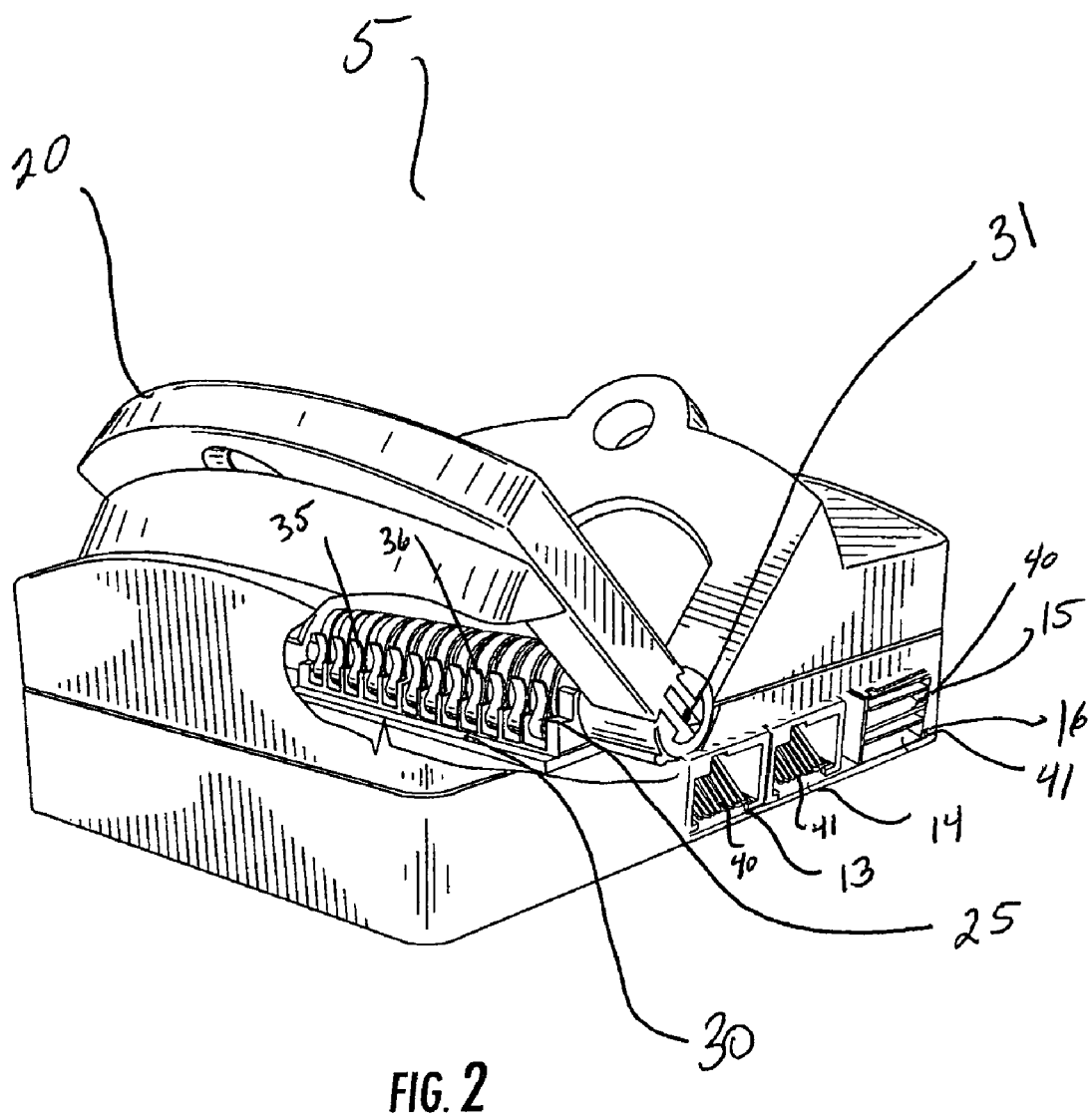
FIG. 2 is a side view of the computer security switch having a cylindrical contact body connecting a data source to a computer via registered jack ports and universal serial bus ports.

In the embodiment of FIG. 2, the security device (5) includes a rotatable lever (20) connected to a contact body (30) having a plurality of data communication paths (25) connecting a computer (9) to a data source (3). The security device (5) receives incoming data from the data source (3) via at least one of the input ports (13, 15). For seamless data transmission, the data can traverse an appropriate data cable through the input port, across the contact body (30), and out the appropriate output port (14, 16) to be used by the computer (9).

In operation, the arcuate movement of the lever (20) opens or closes at least one, and possibly all, of the connections between the communication paths (25) and the data lines connecting the data source (3) and the computer (9). The lever (20) rotates between opposite positions to open or close some or all of these connections, thereby preventing or allowing data transmission to or from the computer (9).

The lever (20) may be located inside the body of the computer (9) but is preferably accessible for turning from outside the body of the computer (9). In an especially preferred embodiment, the lever (20) and the contact body (30) are located entirely outside the body of the computer (9) and together form a modular, removable enhancement to the computer (9).

Figure 3A:
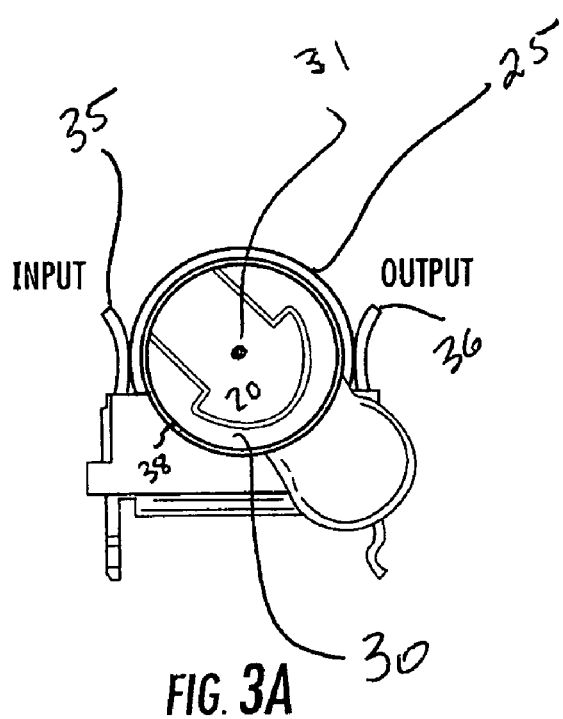
FIG. 3A is a side view of the computer security switch of FIG. 2 in the conducting position allowing data to flow between a data source and a computer.
Figure 3B:
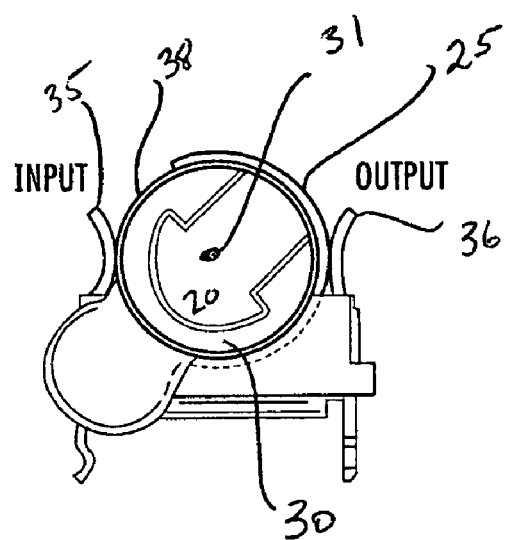
FIG. 3B is a side view of the computer security switch of FIG. 3 in the non-conducting position that prevents data to flow between a data source and a computer.

As shown in FIGS. 2, 3A, and 3B, the computer security device (5) may include a contact body (30) that is cylindrical and rotates about a central axis (31). In this embodiment, data communication paths (25) partially traverse the circumference of the cylindrical contact body (30). The lever (20) controls the rotation of the contact body (30) such that the contact body (30) rotates about its axis (31) in response to arcuate movement of the lever (20).

In one preferred embodiment, arcuate movement of the lever (20) turns the contact body (30) and places the communication paths (25) in data contact with incoming and outgoing data lines via prongs (35, 36) connected to the ports (13-16) on the security device (5), thereby placing a data source (3) and a computer (9) in data communication with one another. In a companion embodiment, arcuate movement of the lever (20) in the opposite direction turns the contact body (30) and places the communication paths (25) out of data contact with at least one or all of the incoming and outgoing data lines. In this position, at least one of the prongs (35, 36) transmitting incoming and outgoing data are grounded by a portion (38) of the surface of the contact body (30) that has no conductive material thereon. By breaking the data connection between the data communication paths (25) on the contact body (30) and the incoming or outgoing data lines, the security device (5) can prevent the transmission of data between the data source (8) and the computer (9). In fact, the security device (5) can break all incoming and outgoing data connections between the computer (9) and a data source (3). By physically disallowing data transmission between the computer and the outside data source, the security device (5) provides a way to prevent unauthorized communication between the computer and the data source by a simple turn of the lever (20).

The efficiency of the security device lies in its ability to simply connect and disconnect incoming and outgoing data paths between a computer (9) and a data source (3). The user merely turns the lever (20) to close the circuit between the data source (3) and the computer (9), thereby allowing data communication. Alternatively, the user can turn the lever (20) to an opposite position to open the circuit between the data source (3) and the computer (9) to prevent data communication.

In a preferred embodiment, the lever (20) controls the position of all of the data communication paths (25) on the contact body (30). Turning the cylindrical contact body (30) moves the contact body (30) so that either the incoming data lines from the data source (3) or the outgoing data lines to the computer (9) are not in contact with the data communication paths (25) on the contact body (30).

In one embodiment, the data lines from the data source (3) and data lines back to the computer (9) connect to the appropriate input or output port (13-16) on the security device (5). The security device includes certain edge traces (40) that pick up the data signal from the incoming port (13, 15) and other edge traces (41) that connect the output signal to the output port (14, 16). The edge traces connect to prongs (35, 36) that are in flexible contact with the contact body. By turning the cylindrical contact body (30) to a certain position, a portion of the contact body (30) that has no data communication path (25) thereon is in contact with the prongs (35, 36), thereby disconnecting the data path.

It is within the scope of this invention for the lever (20) to be selectively connected to a portion of the contact body (30) so that the user can connect and disconnect any desired number of the data communication paths (25) to any selected edge traces (40, 41). In this embodiment, for example, the user could disconnect the registered jack lines while leaving the universal serial bus lines connected if an application made that configuration desirable.

One important aspect of this invention, however, lies in its ability to completely connect and disconnect a computer (9) and a data source (3). For the maximum security, the user can physically prevent any data from being transferred along any data path between the data source (3) and the computer (9). This disconnect feature will absolutely prevent unauthorized data transmission in the form of viruses, spying mechanisms, data theft devices, and other intrusive lines of data manipulation from reaching the user's computer. In its maximum security configuration, therefore, a single turn of the lever (20) causes an equal rotation of the cylindrical contact body (30) so that the data communications paths (25) on the contact body (30) are connected to neither the edge traces (40-43) nor the incoming and outgoing data lines (50-53).

Figure 4:
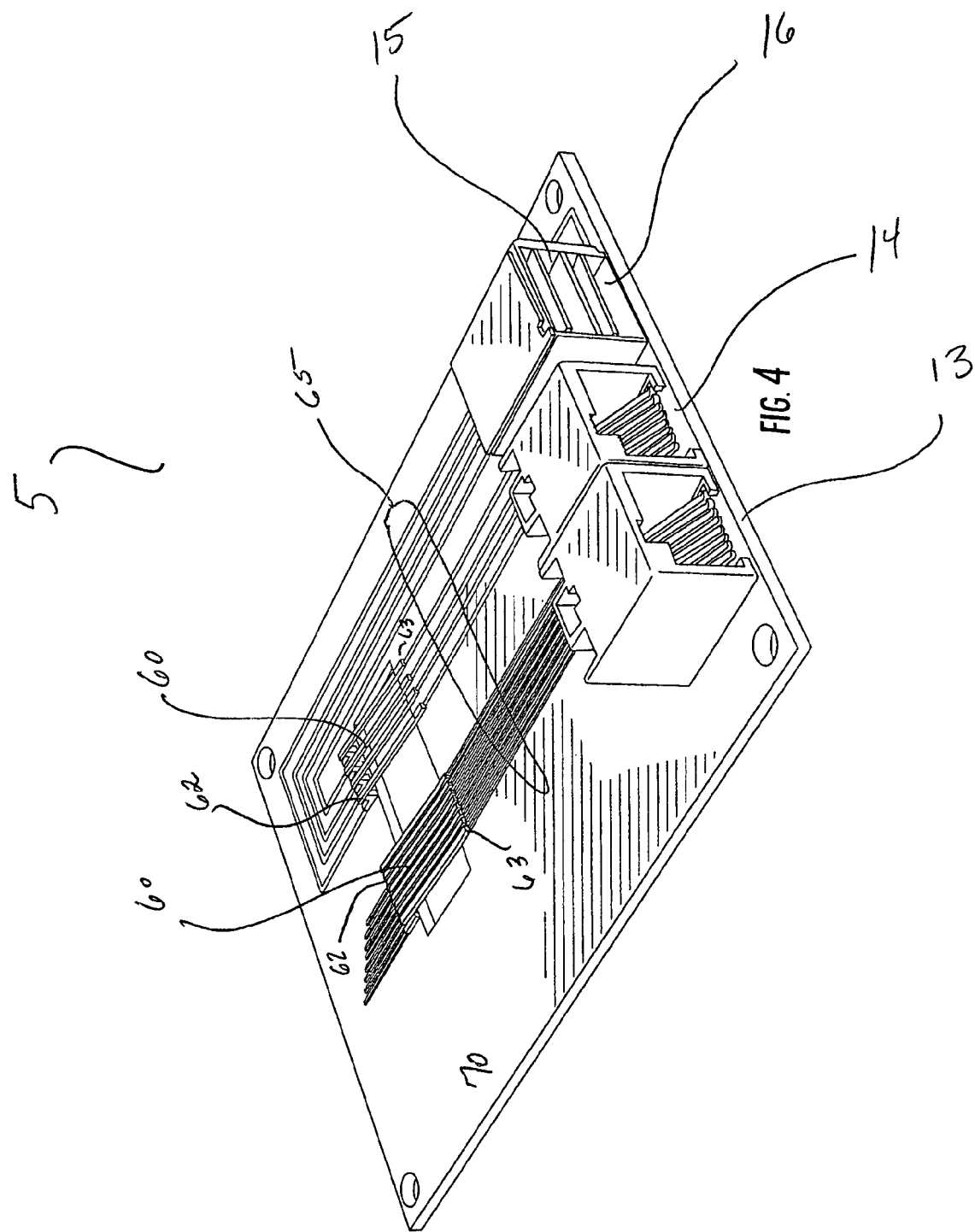
FIG. 4 is a plan view of a computer security switch having a spring board connecting data communication paths between a data source and a computer.

FIG. 4 shows another embodiment of the security device for physically disconnecting a computer and a data source. In this embodiment, the contact body (30) is a spring board (60) within a platform (70), wherein a portion of the spring board (60) is connected to the platform (70) while the remainder of the spring board (60) is detached from the platform (70). For example, in the embodiment of FIG. 4, one end (63) of the spring board (60) is attached to the platform (70) while the remaining perimeter of the spring board (60) is detached. The spring board (60) is sufficiently flexible to be moved into and out of the plane of the platform (70) at a detached end (62) while remaining attached to the platform on the opposite end (63).

In this embodiment of the security device (5), the data communication paths (65) traverse the platform (70) and the spring board (60). When the spring board (60) is in the same plane as the platform (70), data is allowed to flow across the platform (70) along the data communication paths (65). The data communication paths (65) are connected to the appropriate input ports and output ports (13-16) of the security device (5), and, accordingly, data lines (50-53) are connected to the ports (13-16). In this configuration, the data source (3) and the computer (9) are in data communication with one another.

Figure 5A:
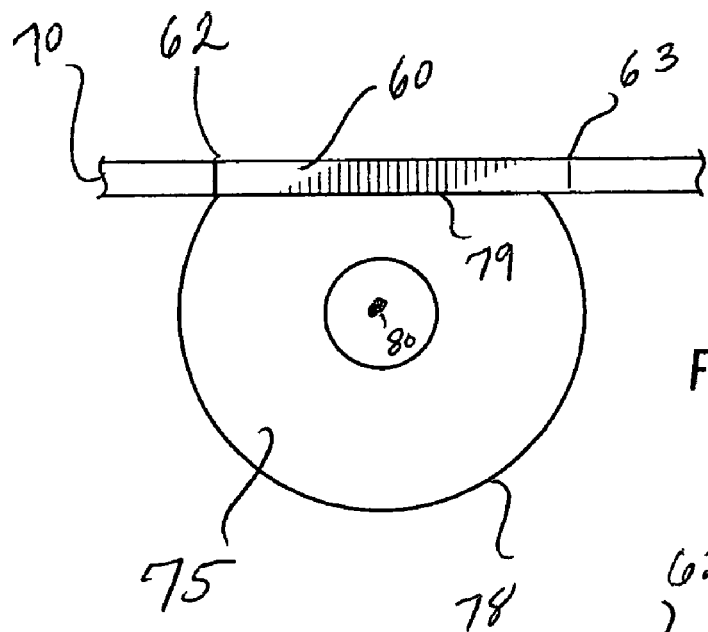
FIG. 5A is a side view of the computer security switch of FIG. 4 in which a lift supports the spring board in the closed position allowing data to flow across the springboard.
Figure 5B:
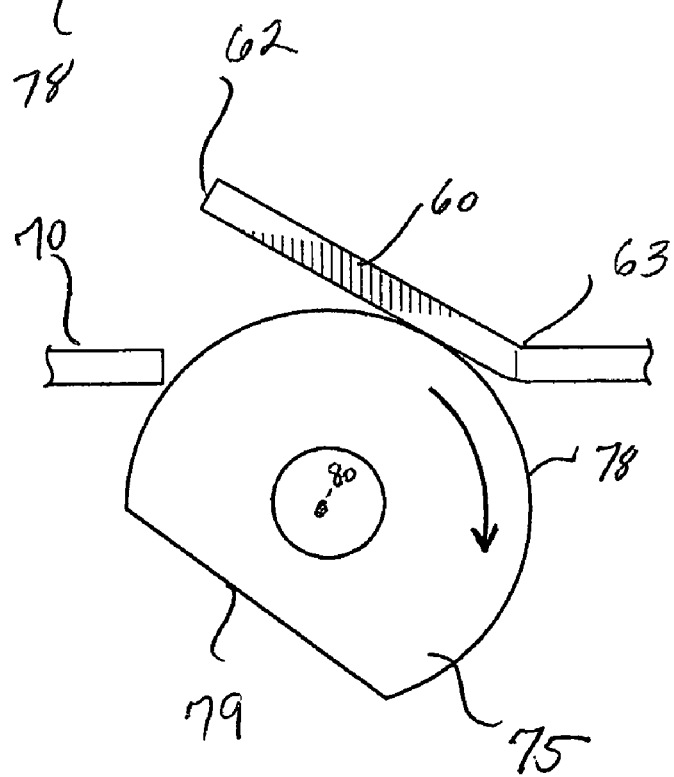
FIG. 5B is a side view of the computer security switch of FIG. 4 in which a lift supports the spring board in an open position disallowing data to flow across the springboard.

According to this embodiment of the invention, as shown in FIGS. 4, 5A, and 5B, the spring board (60) may be moved out of the plane of the platform (70). When the detached end (63) of the spring board (60) is out of the plane of the platform (70), the data circuit between the data source (3) and the computer (9) is broken. Hence, no data can flow between the two. Again, this ability to physically break the circuit between the data source and the computer provides a security mechanism that cannot be avoided.

In a preferred embodiment, the lever (20) of the security device (5) is connected to the spring board (60) by a lift (75). The spring board (60) rests on the lift (75), which has a raised or rounded surface (78) on one side and a flat surface (79) on the other. The lever (20) is attached to the lift (75) along the axis (80) of the lift (75). The arcuate movement of the lever (20) moves the lift (75) so that the raised or rounded surface of the lift (75) moves the spring board (60) vertically out of the plane of platform (70). Moving the spring board (60) out of the plane of the platform disconnects the communications paths (65) traversing the platform (70). An opposite arcuate movement of the lever (20) places the flat surface of the lift (75) against the bottom of the spring board (60). This lowers the spring board (60) into the plane of the platform (70), thereby connecting the communication paths (65) traversing the platform. Again, the lever may be located inside the body of the computer but accessible for turning from outside the body of the computer. The embodiment of FIGS. 4, 5A, and 5B, therefore, provides another circuit disabling mechanism to physically disconnect a computer (9) from a data source (3) by turning the lever (20).

Figure 6:
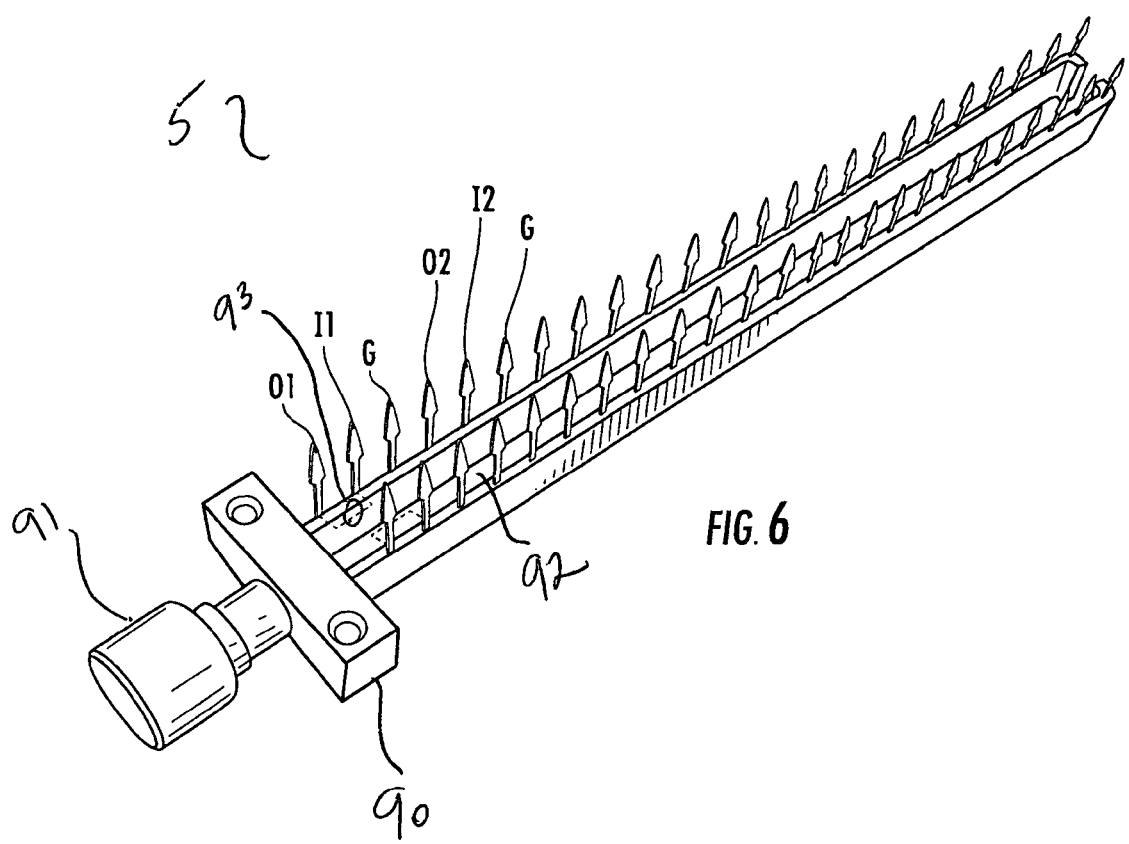
FIG. 6 is a plan view of the computer security switch using a multi-pole, single throw pushbutton switch to connect and disconnect a data source and a computer.
Figure 7:
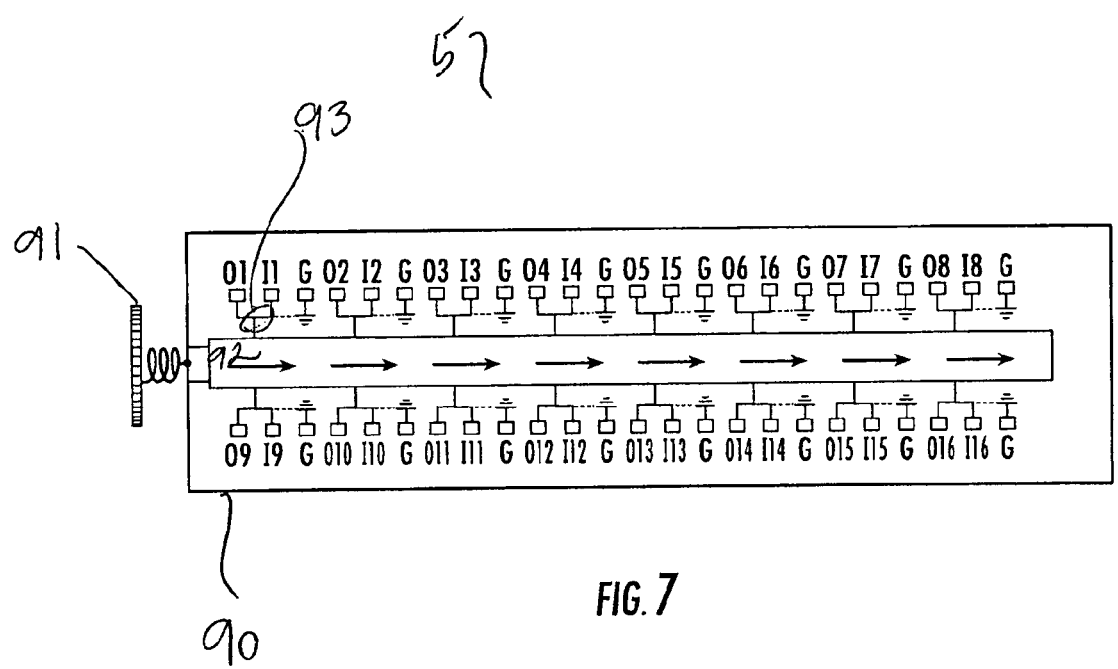
FIG. 7 is a schematic view of the computer security switch of FIG. 6 showing the contact positions when the push button is activated.

In the embodiment of FIGS. 6 and 7, the contact body (30) of the security device (5) may be a twelve pole, single throw switch (90) with input contacts (I1, I2, etc.) and output contacts (O1, O2, etc.). The term twelve pole, single throw is used herein in its ordinary fashion in the art, i.e., a single throw of the switch engages and disengages all twelve I/O circuits. In a preferred embodiment, the switch has at least four input contacts and at least four output contacts providing communications links between a data source (3) and a computer (9). The twelve pole, single throw switch (90) is capable of being manually engaged and disengaged by the user to connect and disconnect data transmission to and from the computer.

The twelve pole, single throw switch of this invention could be created by using a switch with more than twelve available circuits, such as the security device of FIGS. 6 and 7. Incoming data lines (50, 52) connect to the appropriate input port (13, 15), and outgoing data lines (51, 53) connect to the appropriate output ports (14, 16) on the security device (5). The input ports (13, 15) are connected by wiring or other data transmitting leads to the input contacts (I1, I2, etc.) on the switch (90). The output ports (14, 16) are connected by wiring or other data transmitting leads to the output contacts (96) on the switch (90).

The switch shown in FIGS. 6 and 7 is one, but not the only, single throw switch that would accomplish the desirable functions herein. In the switch of FIGS. 6 and 7, the input contact (I1) is the common terminal between the output contact (O1) and the ground terminal (G). In normal operation, input data from the data source (3) comes in on I1 and out to the computer (9) on O1. When the user throws the switch, however, the slide mechanism (92) of the pushbutton switch (90) moves the input data line (93) from the output connection (O1) to the ground connector (G). In this fashion, one push of the button (91) on the switch connects and disconnects incoming or outgoing data as the user prefers.

Depending upon the type of input and output cables used to connect the data source (3), the security device (5), and the computer (9), the twelve pole, single throw switch (90) may have at least eight input contacts and eight output contacts providing communications links between the data source (3) and the computer (9). In fact, under certain circumstances, the twelve pole, single throw switch may have all twelve input contacts and all twelve output contacts providing communications links between the data source (3) and the computer (9).

In a preferred embodiment, the switch (90) operates in a normally closed configuration. The user, however, may manually throw the switch to open the circuits connecting the switch to the incoming and outgoing data lines (50-53). Again, this function allows the user to completely disconnect the computer from a data source without fear of some secondary connection. From the outside, the security device (5) is unavoidable, and intruders are completely broken off from any form of data communication with the computer (9).

Figure 8:
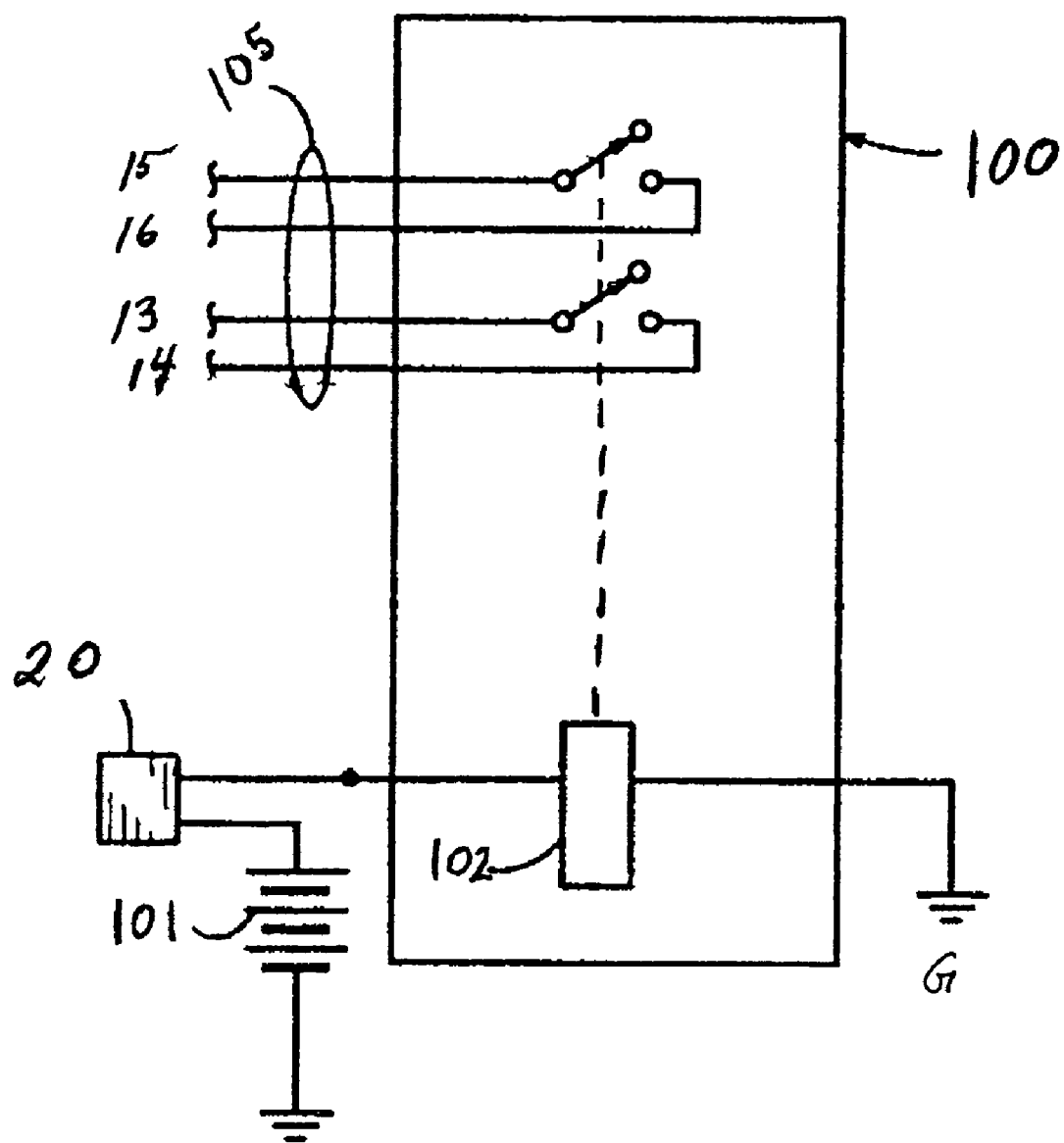
FIG. 8 is a schematic view of the computer security switch in the form of a relay control system.

In yet another embodiment shown in FIG. 8, the computer security device for controlling the passage of data communication signals between a data source and a computer may include a relay assembly (100) for switching data communications paths (105) back and forth between an open position and a closed position. The open position prevents data transmission through the relay assembly (100) and the closed position permits data transmission through the relay assembly (100). In this embodiment, the manually operated lever (20) switches the relay assembly (100) back and forth from open and closed positions.

The overall security device utilizing the relay of FIG. 8 includes a first data port (13) for transmitting data from a data source (3) to the relay assembly (100) via a first type of data line, a second data port (14) for transmitting data from the relay assembly (100) to the computer (9) via the first type of data line, a third data port for transmitting data from a data source to the relay assembly via a second type of data line, and a fourth data port for transmitting data from the relay assembly to the computer via the second type of data line. The communications path between the data source and the computer is established by at least one of the first and second types of data lines connected to the relay assembly. The lever (20) controls the position of the relay assembly (100) to permit or prevent data transmission between the data source (3) and the computer (9). The security device (5) is detachable from the data lines so that the communications path between the data source (3) and the computer (9) includes the relay assembly (100) at the option of the computer user.

According to this embodiment of the security device, the first and second data ports (13, 15) connect a computer (9) to a data source (3) via a data line selected from the group consisting of a registered jack line and a universal serial bus line. The third and fourth data ports (14, 16) connect a computer (3) to a data source (9) via a data line selected from the group consisting of a registered jack line and a universal serial bus line. The computer security device is formed within a modular housing having openings for connected data lines to said ports. As discussed above, the lever and the relay assembly may be located inside the body of the computer but are accessible for activating and deactivating the relay (100) through the coil (102) of the relay from outside the body of the computer.

Figure 9:
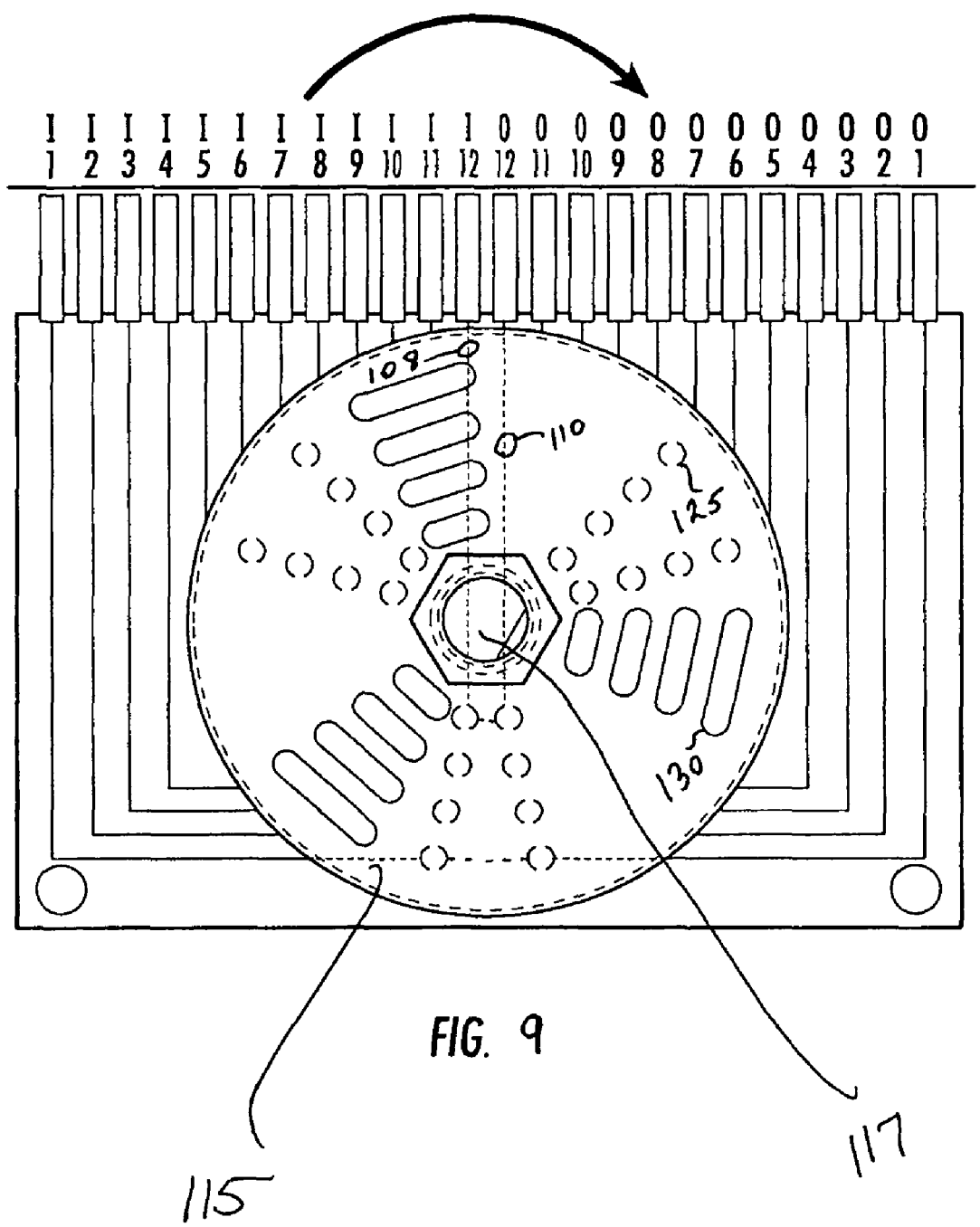
FIG. 9 is a plan view of the computer security switch in which a data source and a computer are connected and disconnected by a rotary switch.

In another embodiment, shown in FIG. 9, the security device (5) has a contact body (30) in the form of a rotary switch (115), wherein the lever (20) of the invention is a handle (117) on the rotary switch (115). The user turns the rotary switch (115) by operating the handle (117). In the rotary switch embodiment, the contact body has a flat surface with connector points and grounding points. Arcuate movement of the handle turns the flat surface and positions either connector points or grounding points between data lines connected to the contact body. In this way, the user can selectively connect or disconnect communication paths attached to the inputs and outputs on the switch (I1-I12, O1-O12).

In the embodiment of FIG. 9, the flat surface of the rotary switch (115) includes edge traces (108) that pick up the signals from the input tabs (I1-I12) and other edge traces (110) that send a data signal back out to the output tabs (O1-O12). The flat surface of the rotary switch includes connector points (125) and grounding points (130) that are radially positioned from the center of the flat surface. In the communications mode, the data from the data source (3) comes in on one of the input tabs (I1-I12) and is picked up on an edge trace (108). The input data travels across the edge trace (108), and through the appropriate connector points (125) before being picked up by another edge trace (110), which sends the data back to an output tab (O1-O12).

By turning the handle (117) and rotating the switch (115), the user can optionally position a grounding point (130) between the input data edge trace (108) and the output data edge trace (110). The grounding point (130), therefore, is made of a material that disallows data communication to cross. When the rotary switch is in the disconnect mode, input data cannot traverse the switch and has no opportunity to affect a computer attached to the output.

The rotary switch embodiment of the security device can easily be installed to an existing computer for convenience of the user. Again, as noted above, one goal of this invention is to allow a computer user an convenient mechanism for completely disallowing data access to a personal computer or other electronic device.

In the specification and the figures, typical embodiments of the invention have been disclosed. Specific terms have been used only in a generic and descriptive sense, and not for purposes of limitation. The scope of the invention is set forth in the following claims.

The invention claimed is:

1. A computer security device for controlling the passage of data communication signals to and from a computer, comprising a rotatable lever connected to a cylindrical contact body having a plurality of data communication paths thereon, wherein: (i) said rotatable lever controls rotation of said cylindrical contact body, (ii) said data communication paths partially traverse a circumference of said cylindrical contact body, and (iii) arcuate movement of said rotatable lever selectively connects and disconnects at least one of the communication paths from at least one of the data lines to control the transmission of at least one communications signal to or from the computer.

2. A computer security device according to claim 1, wherein is said rotatable lever is located inside the body of the computer but is accessible for turning from outside the body of the computer.

3. A computer security device according to claim 1, wherein said rotatable lever opens or closes all of the communication paths allowing transmission of any communications signal to or from the computer.

4. A computer security device according to claim 1, wherein said contact body rotates about a central axis.

5. A computer security device for controlling the passage of data communication signals to and from a computer, comprising:
 a spring board within a platform, wherein: (i) a portion of said spring board is connected to said platform while the remainder of said spring board is detached from said platform, (ii) data communication paths traverse said platform and said spring board; and (iii) said spring board is sufficiently flexible to be moved out of the plane of said platform on one end while attached to the platform on the opposite end; and
 a lever connected to said spring board for moving said spring board in and out of the plane of said platform to selectively connect and disconnect said data communication paths, wherein said lever is located inside the body of the computer but is accessible for turning from outside the body of the computer.

6. A computer security device according to claim 5, wherein movement of said lever lifts said spring board out of the plane of said platform, thereby disconnecting said communications paths traversing said body.

7. A computer security device according to claim 5, wherein movement of said lever lowers said spring board into the plane of said platform, thereby connecting said communication paths traversing said body.

* * * * *